(12) United States Patent
Farkas et al.

(10) Patent No.: US 9,635,190 B2
(45) Date of Patent: Apr. 25, 2017

(54) METHODS, SYSTEMS, AND COMPUTER PROGRAM PRODUCTS FOR COMMUNICATING DATA SELECTIVELY VIA HETEROGENEOUS COMMUNICATION NETWORK LINKS

(71) Applicant: Collision Communications, Inc., Peterborough, NH (US)

(72) Inventors: Joseph Farkas, Merrimack, NH (US); Brandon Hombs, Merrimack, NH (US); Barry West, Temple, NH (US)

(73) Assignee: Collision Communications, Inc., Peterborough, NH (US)

( * ) Notice: Subject to any disclaimer, the term of this patent is extended or adjusted under 35 U.S.C. 154(b) by 276 days.

(21) Appl. No.: 14/453,853

(22) Filed: Aug. 7, 2014

(65) Prior Publication Data
US 2016/0044181 A1    Feb. 11, 2016

(51) Int. Cl.
| H04M 11/00 | (2006.01) |
| H04M 15/00 | (2006.01) |
| H04W 48/18 | (2009.01) |
| H04L 12/14 | (2006.01) |
| H04W 4/24 | (2009.01) |

(52) U.S. Cl.
CPC ........ *H04M 15/8061* (2013.01); *H04L 12/14* (2013.01); *H04M 15/8033* (2013.01); *H04W 4/24* (2013.01); *H04W 48/18* (2013.01)

(58) Field of Classification Search
CPC .................................................. H04M 15/8061
See application file for complete search history.

(56) References Cited

U.S. PATENT DOCUMENTS

| 2010/0145161 A1* | 6/2010 | Niyato | ................ G06F 19/3418 600/300 |
| 2015/0032428 A1* | 1/2015 | Hasegawa | ............... G06F 17/10 703/2 |

* cited by examiner

*Primary Examiner* — Justin Lee (57) ABSTRACT

Methods and systems are described for communicating data selectively via heterogeneous communication network links. In one aspect, a network link selector (NLS) determines respective data costs associated with communicating data via a plurality of heterogeneous network links each linking to one or more networks. One or more network links to communicate data between a remote network node and a user device remotely communicating with the NLS via a network is selected from among the plurality of heterogeneous network links based on the determined respective data costs. Communicating the data via the selected link is provided for. In another aspect, link selection information based on respective data costs is received via a network from an NLS. One or more network links is selected from among the plurality of heterogeneous network links based on the received link selection information. The data is communicated via the selected link.

50 Claims, 6 Drawing Sheets

202
DETERMINE, BY A NETWORK LINK SELECTOR (NLS), RESPECTIVE DATA COSTS ASSOCIATED WITH COMMUNICATING DATA VIA A PLURALITY OF HETEROGENEOUS NETWORK LINKS EACH LINKING TO ONE OR MORE NETWORKS

204
SELECT, FROM AMONG THE PLURALITY OF HETEROGENEOUS NETWORK LINKS BASED ON THE DETERMINED RESPECTIVE DATA COSTS, ONE OR MORE NETWORK LINKS TO COMMUNICATE DATA BETWEEN A REMOTE NETWORK NODE AND A USER DEVICE REMOTELY COMMUNICATING WITH THE NLS VIA A NETWORK

206
PROVIDE FOR COMMUNICATING THE DATA VIA THE SELECTED LINK

METHODS, SYSTEMS, AND COMPUTER PROGRAM PRODUCTS FOR COMMUNICATING DATA SELECTIVELY VIA HETEROGENEOUS COMMUNICATION NETWORK LINKS

BACKGROUND

User devices, such as a mobile device, cellular phone, a personal digital assistant (PDA), a wireless modem, a wireless communication device, a handheld device, a laptop computer, a wireless local loop (WLL) station, a tablet computer, or the like, today are capable of communicating via a number of available distinct communication data links (also referred to herein as heterogeneous network links). For example, many user devices today are capable of communicating via many different network links such as a Long Term Evolution (LTE) or LTE-Advance (LTE-A) (also referred to as 4G), Code Division Multiple Access (CDMA) or Wideband CDMA (WCDMA) (also referred to as 3G), Global System for Mobile Communications (GSM) (also referred to as 2G), IEEE 802.11 (Wi-Fi), Bluetooth and often other links are available for sending and receiving data. This plethora of available communication links provides an opportunity to use the multiple data links to more optimally send and receive user's data. For example, one or more of the network links available can be selected in order to maximize throughput, minimize latency, increase reliability, minimize interference, maximize battery life and/or minimize data fees.

Conventional approaches to link selection have operated at the user device or as a local extension of the user device. These approaches provide access only to metrics that are available at the user device. Thus, conventional approaches generally do not see enough of the network to select links based on network conditions. For example, while a user device may select to use Wi-Fi instead of LTE whenever Wi-Fi is available with the underlying premise that Wi-Fi is a better or cheaper connection, such a decision would be better informed if the user device would receive from another device monitoring conditions within the network more complete information about the user experience associated with communicating data via each network link through the network to/from a remote endpoint.

Accordingly, there exists a need for methods, systems, and computer program products for communicating data selectively via heterogeneous communication network links.

SUMMARY

Methods and systems are described for communicating data selectively via heterogeneous communication network links. In one aspect a network link selector (NLS) determines respective data costs associated with communicating data via a plurality of heterogeneous network links each linking to one or more networks. One or more network links to communicate data between a remote network node and a user device remotely communicating with the NLS via a network is selected from among the plurality of heterogeneous network links based on the determined respective data costs. Communicating the data via the selected link is provided for.

In another aspect, link selection information based on respective data costs associated with communicating data via a plurality of heterogeneous network links each linking to one or more networks is received via a network from an NLS. One or more network links to communicate data between a remote network node and a user device remotely communicating with the NLS is selected from among the plurality of heterogeneous network links based on the received link selection information. The data is communicated via the selected link.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
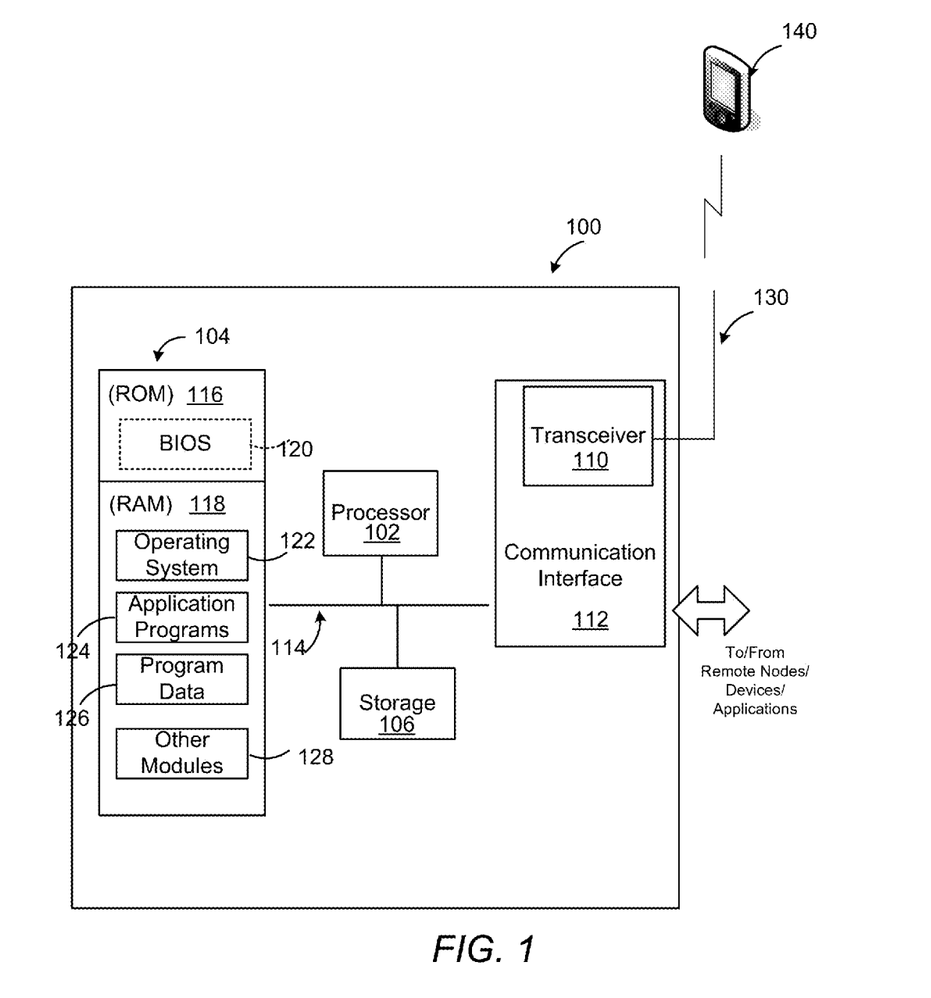
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of any network node, such as a server, a router, a base station, and/or a user device configured to communicate in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more user devices 140 via a transceiver 110 connected to an antenna 130. The user devices 140 can be dispersed throughout the network 100. A user device 140 may be referred to as user equipment (UE), a terminal, a mobile station, a subscriber unit, or the like. A user device 140 may be a cellular phone, a personal digital assistant (PDA), a wireless modem, a wireless communication device, a handheld device, a laptop computer, a wireless local loop (WLL) station, a tablet computer, or the like. A user device 140 may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

A better, "big picture," approach to selecting network links takes the conditions of the network into consideration when selecting a network link for a user device to communicate. Knowledge of the network conditions can provide better optimizations for the user device and also provides for network level precautions that protect the network itself. For example, a link can be selected based on interference levels in the network links, which would provide load balancing for the network, which improves the user experience of other users of the network.

In order to better ascertain network conditions, a better approach is to determine link selection information about the network itself as it pertains to a communication path through the network associated with each link and provide the information to the user device. The information can be a link selection made for the user device or can be information that aids the device in selecting a link. Accordingly, a network link selector (NLS) is connected within the network to provide link selection information to the mobile device. The NLS thereby can have an internal network perspective not afforded to a user device and can obtain better network knowledge through, for example, device polling and/or monitoring of network traffic.

Figure 2:
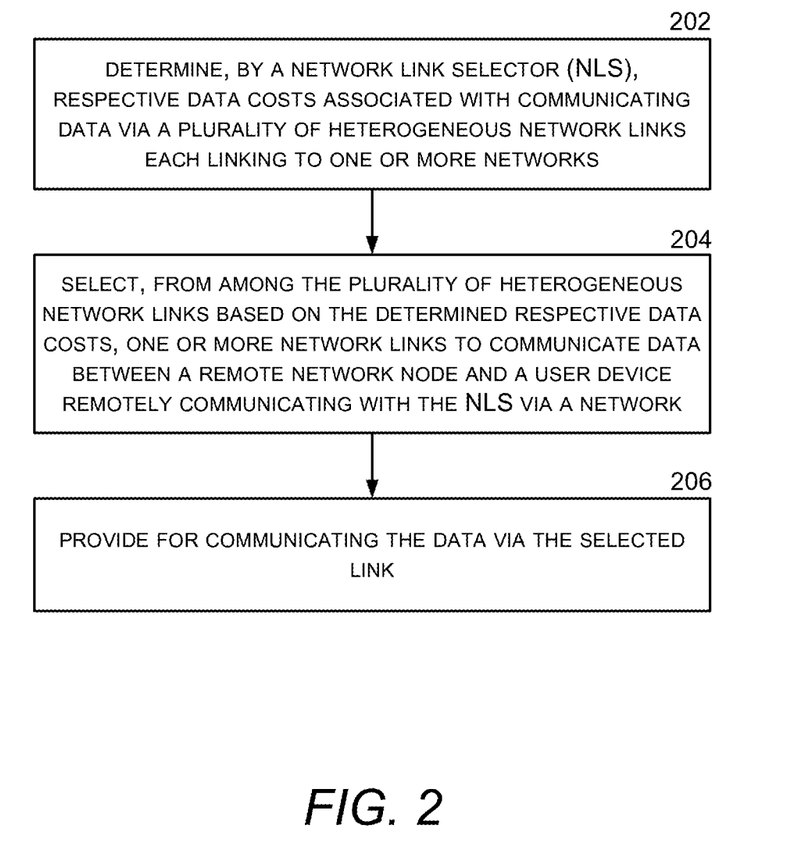
FIG. 2 is a flow diagram illustrating a method for communicating data selectively via heterogeneous communication network links according to an aspect of the subject matter described herein.
Figure 3:
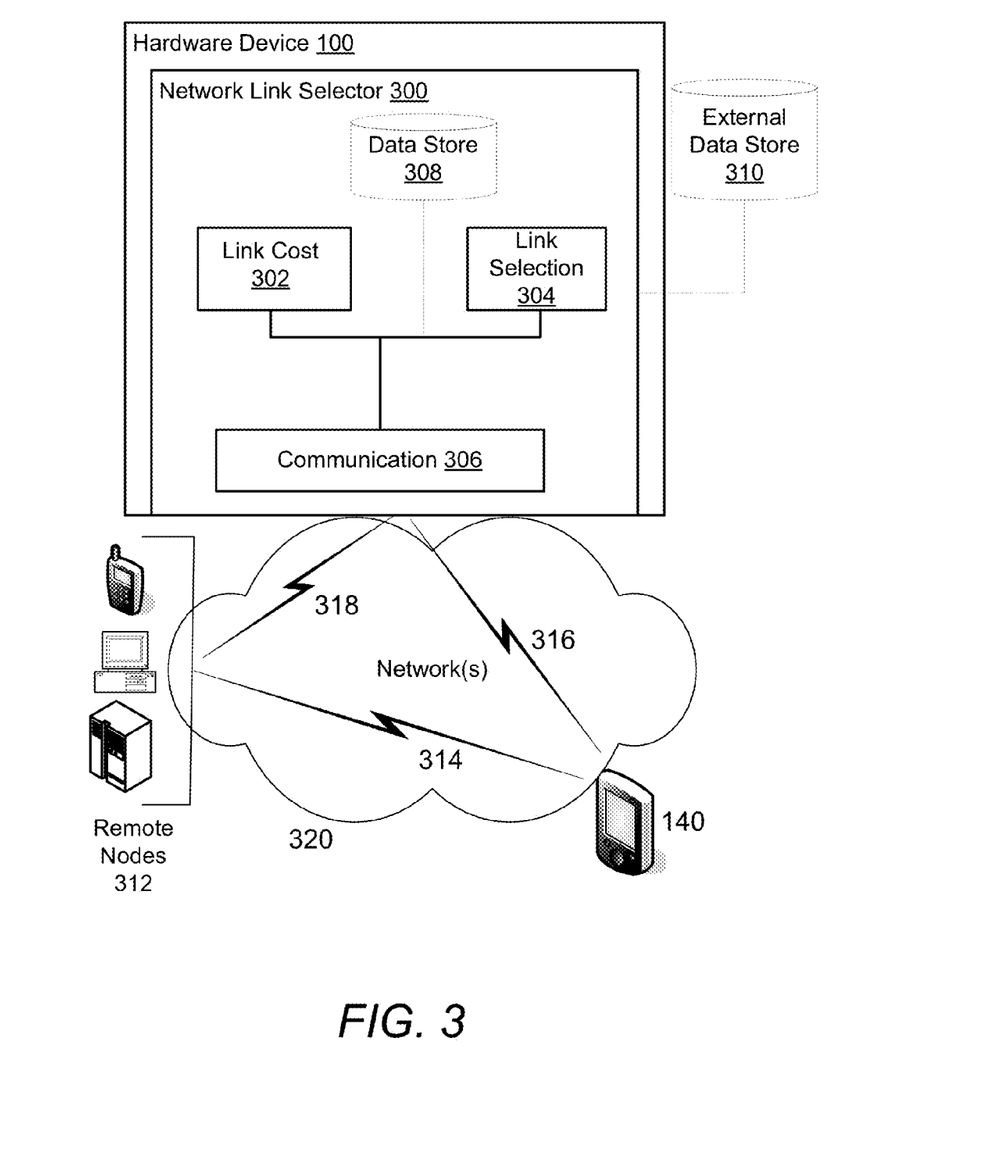
FIG. 3 is a block diagram illustrating an arrangement of components for communicating data selectively via heterogeneous communication network links according to another aspect of the subject matter described herein.

Turning now to FIG. 2, a flow diagram is illustrated illustrating a method for communicating data selectively via heterogeneous communication network links according to an exemplary aspect of the subject matter described herein. FIG. 3 is a block diagram illustrating an arrangement of components for communicating data selectively via heterogeneous communication network links according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement in FIG. 3 operating in an a compatible execution environment, such as the environment provided by some or all of the components of the arrangement in FIG. 1. The arrangement of components in FIG. 3 may be implemented by some or all of the components of the hardware device 100 of FIG. 1.

With reference to FIG. 2, in block 202 respective data costs associated with communicating data via a plurality of heterogeneous network links each linking to one or more networks is determined by a NLS. Accordingly, a system for communicating data selectively via heterogeneous communication network links includes means for determining, by a NLS, respective data costs associated with communicating data via a plurality of heterogeneous network links each linking to one or more networks. For example, as illustrated in FIG. 3, a link cost component 302 of the NLS 300 is configured to determine respective data costs associated with communicating data via a plurality of heterogeneous network links each linking to one or more networks.

FIG. 3 is a block diagram illustrating an arrangement of components for communicating data selectively via heterogeneous communication network links according to another aspect of the subject matter described herein. In FIG. 3, one or more networks 320 interconnect NLS 300, user device 140, and one or more remote network nodes 312, such as another user device, a PC, a server. Network 320 includes one or more communication links between the various devices illustrated by communication links 314, 316, and 318, which can each represent a plurality of heterogeneous network links. The term heterogeneous network links as used herein refers to links between devices in a network that provide access to one or more networks but that are of different types from each other. For example, the plurality of heterogeneous network links can include network links of the type LTE, LTE-A, CDMA, WCDMA, CDMA2000, GSM, TDMA, FDMA, OFDMA, SC-FDMA, UTRA, E-UTRA, UMB, Wi-Fi, WiMAX, IEEE 802.20, Flash-OFDMA, and Bluetooth.

Each of these links will have a respective data cost associated with it. The data cost could be a cost to the user of the user device 140, such as in terms of data throughput, data latency, transmission reliability, power consumption, and/or data transmission fees. Alternatively, the data cost could be a cost to the network, such as to load balance, prevent transmission interference, and/or otherwise maintain network usability above a minimum quality for users in general.

The NLS 300 has an internal network perspective not afforded to a user device and can obtain better network knowledge through, for example, device polling and/or monitoring of network traffic. Device polling may include receiving information from the device and/or infrastructure on a regular basis. Device polling may specifically include requesting information regarding the availability of different networks, any available statistics about those networks, network conditions, network identification, device location, device velocity, and device battery life. Network monitoring may include capturing the transmission of data and control information to obtain network knowledge. Accordingly, the link cost component 302 can be configured to determine respective data costs by determining at least one of data throughput, data latency, transmission reliability, transmission interference, power consumption, user device location information, network link location information, and data transmission fees. Network monitoring may also include geolocation and tracking of user devices or other network nodes.

In another aspect, the respective data costs includes respective data costs based on past data cost information. For example, the past data cost information can include past data cost information for a current location of the user device 140. For example, the past information can be used along with the location information to predict that a user is going into a dead-spot prior to the user arriving in the dead-spot and an alternative network link can be selected as described below. One example is when a user device 140 is approaching a Wi-Fi dead-spot, a switch can be made to an LTE connection. The data cost information can be stored in a local data store 308 and/or a remote data store 310, which are both optional components of the system as indicated by dashed lines.

Returning to FIG. 2, in block 204 one or more network links to communicate data between a remote network node and a user device remotely communicating with the NLS 300 via a network is selected from among the plurality of heterogeneous network links based on the determined respective data costs. Accordingly, a system for communicating data selectively via heterogeneous communication network links includes means for selecting, from among the plurality of heterogeneous network links based on the determined respective data costs, one or more network links to communicate data between a remote network node and a user device remotely communicating with the NLS 300 via a network. For example, as illustrated in FIG. 3, a link selection component 304 is configured to select, from among the plurality of heterogeneous network links based on the determined respective data costs, one or more network links to communicate data between a remote network node and a user device remotely communicating with the NLS 300 via a network.

Figure 4:
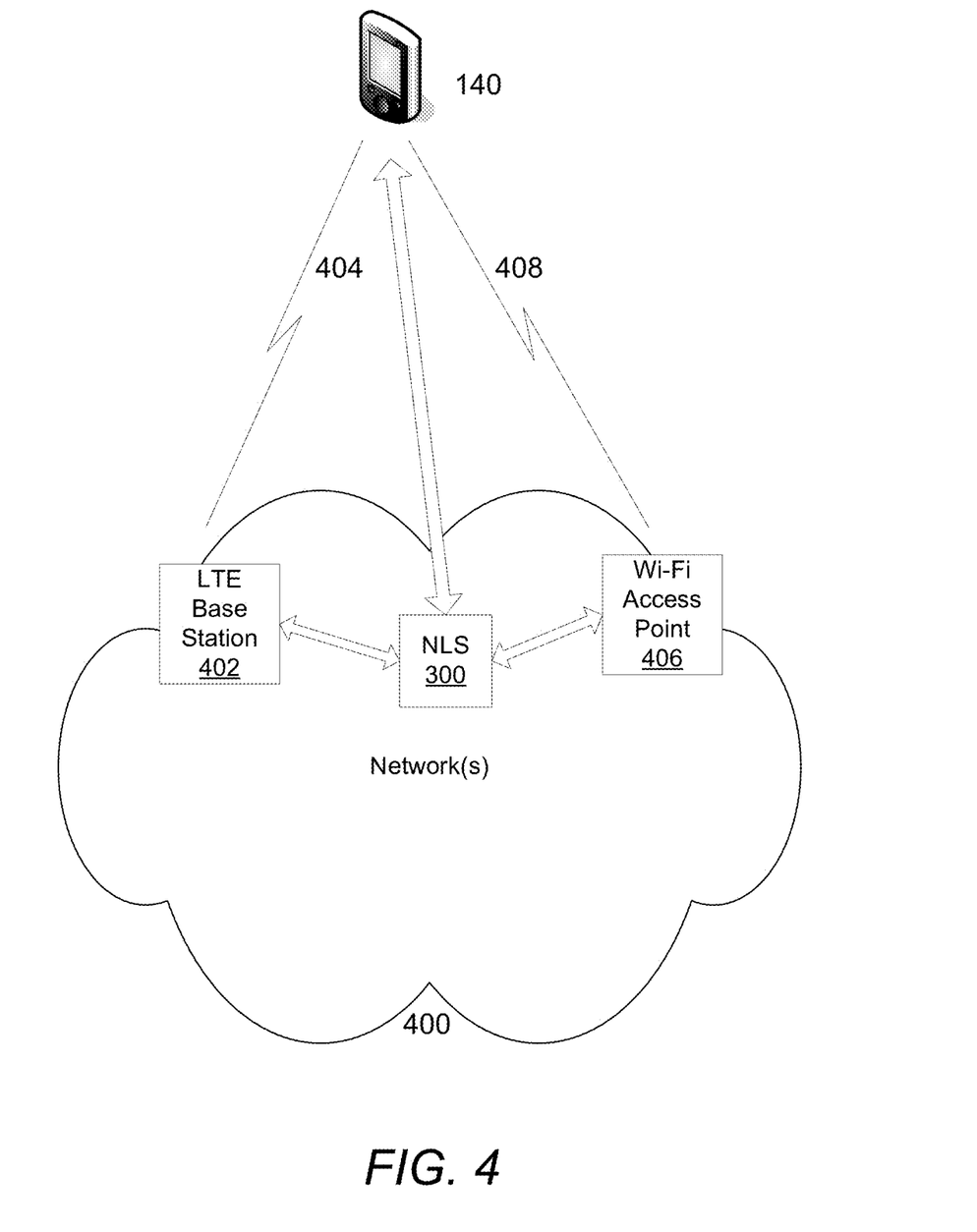
FIG. 4 is a block diagram illustrating a usage example for communicating data selectively via heterogeneous communication network links according to another aspect of the subject matter described herein.

For example, with reference to FIG. 4, user device 140 would like to access one or more networks 400 to communicate information. User device 140 has, among the network links available to it, an LTE link 404 to an LTE base station 402 and supporting infrastructure and a Wi-Fi link 408 to a Wi-Fi access point 406 and supporting infrastructure, such as a network router. NLS 300 provides link selection information to user device 140. The NLS 300 obtains information about the links through network monitoring and/or device polling, which information is not limited to the radio connections but can include information regarding the path through the network after the radio connection utilizing the respective links. For example, the NLS 300 may determine that the Wi-Fi link 408 in the user's apartment building is heavily utilized a certain time of day, such as due to other user's returning home from work and simultaneously accessing network resources, such that the data throughput, latency, or other link cost factors indicate a poor user experience. The analysis can also take into account the location of the user device 140. The NLS 300 also determines that there is a fee associated with data usage by the user device 140 via the LTE link 404 and that otherwise the link cost factors associated with the LTE link 404 indicate it would provide a better user experience. In one aspect, the link selection information provided to the user device 140 includes the respective link cost information for accessing the network via the LTE link 404 and the Wi-Fi link 408 and the device chooses the appropriate link based on the link selection information and can access user preference information to help with the decision. In another aspect, the NLS 300 makes the selection based on the cost information (and can access user preference information to help with the decision) and the link selection information provided to the user device 140 includes the selected link.

Note that in the above example the NLS 300 can also provide link selection information intended to protect the network from, for example, significant interference on a particular network link or from other impacts of using a particular network link.

In an aspect, the link selection component 304 can be configured to select one or more network links by receiving at least one of user preference information and future communication session information from the user device 140 and selecting the network link based on the at least one of user preference information and future communication session information. Returning to the example illustrated in FIG. 4, the user device 140 can provide details to the NLS 300 about the upcoming communication session, such as the type of session and session requirements, or user preference information to provide additional information for the NLS 300 to base its determination. For example, the user device 104 can indicate the user may want to have a data intensive multimedia session, such as downloading a movie for viewing, and that the user has a preference for Wi-Fi to avoid data fees. The link selection component 304 considers this information and determines that the link cost factors for a WiFi link are currently undesirable due to network conditions and instead selects one or more LTE links.

In another aspect, the link selection component 304 can be configured to select one or more links by selecting multiple links and wherein the communication component 306 can be configured to provide for communicating the data by communicating data for a single communication session concurrently via the multiple selected links. Returning to the example illustrated in FIG. 4, the NLS 300 can instruct the user device 140 to transmit some of the data on the LTE link 404 and concurrently, or even simultaneously, transmit some of the data on the Wi-Fi link 408.

Returning to FIG. 2, in block 206 communicating the data via the selected link is providing for. Accordingly, a system for communicating data selectively via heterogeneous communication network links includes means for providing for communicating the data via the selected link. For example, as illustrated in FIG. 3, a communication component 306 is configured to provide for communicating the data via the selected link.

In an aspect, the communication component 306 can be configured to provide link selection information to the user device 140 to provide for the user device 140 to know which network link to use or to use the link selection information to determine which network link to use, as described above.

In another aspect, the communication component 306 can be configured to connect the user device 140 to the one or more selected links such that the data is transmitted via a common link and distributed to the one or more selected links. For example, with reference to FIG. 3, the data can be provided to the NLS 300 via communication link 316 and placed on the one or more selected network links by the NLS 300 via communication link 318 to a remote node 312. Communication link 316 may or may not be one of the multiple heterogeneous network links.

In another aspect, the data is for a single communication session and the communication component 306 can be configured to provide for communicating the data between the user device 140 and the remote network node concurrently via multiple selected links. As shown in FIG. 3, communication link 314 can be made up of multiple network links, such as network links 404 and 408 in FIG. 4, and data for a single communication session can be transmitted over the multiple links concurrently. Alternatively, communication link 316 can be made up of multiple network links carrying data for a single session concurrently that are then combined by NLS 300, such as by the communication component 306, onto a common communication to the remote endpoint via communication link 318.

Figure 5:
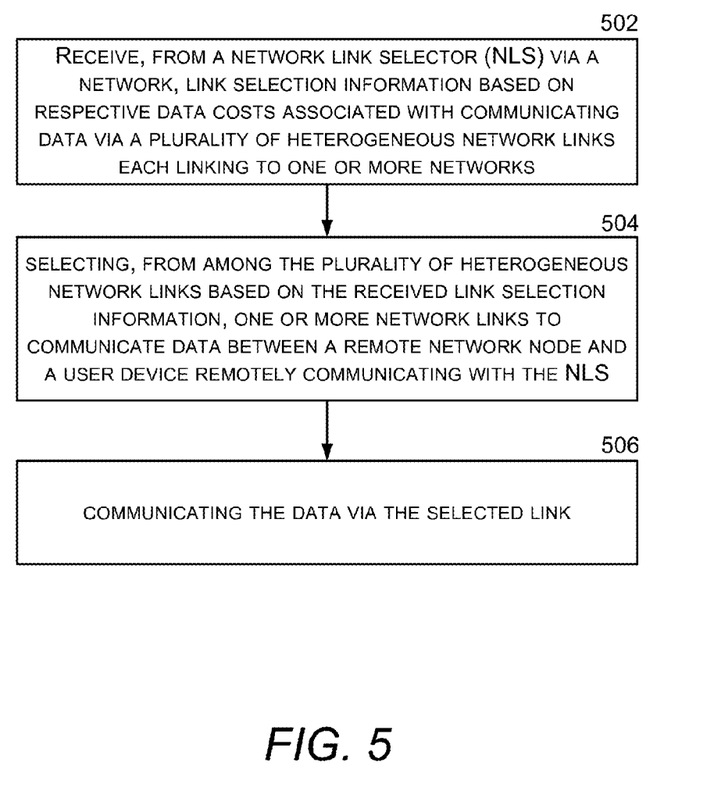
FIG. 5 is a flow diagram illustrating a method for communicating data selectively via heterogeneous communication network links according to another aspect of the subject matter described herein.
Figure 6:
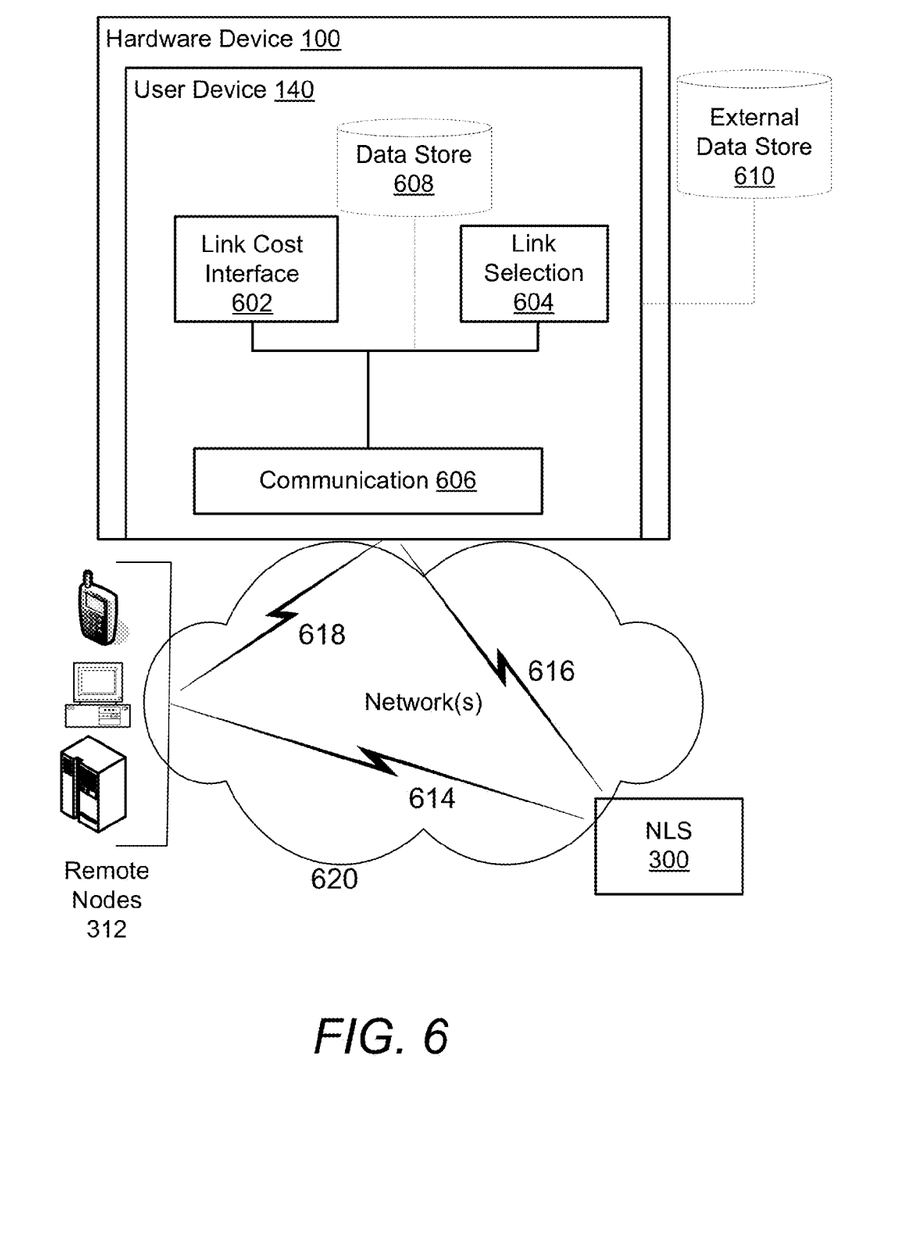
FIG. 6 is a block diagram illustrating an arrangement of components for communicating data selectively via heterogeneous communication network links according to another aspect of the subject matter described herein.

Turning now to FIG. 5, a flow diagram is illustrated illustrating a method for communicating data selectively via heterogeneous communication network links according to an exemplary aspect of the subject matter described herein. FIG. 6 is a block diagram illustrating a system for communicating data selectively via heterogeneous communication network links according to another exemplary aspect of the subject matter described herein. The system shown in FIG. 6 can be part of, for example, a user device 140. FIG. 1 is a block diagram illustrating an arrangement of components providing an execution environment configured for hosting the arrangement of components depicted in FIG. 6. Although, for simplicity, user device 140 is shown separate from hardware device 100 in FIG. 1, it will be understood that the same or similar arrangement of hardware device 100 can be part of user device 140 as well. The method in FIG. 5 can be carried out by, for example, some or all of the components illustrated in the exemplary arrangement in FIG. 6 operating in an a compatible execution environment, such as the environment provided by some or all of the components of the arrangement in FIG. 1. That is, the arrangement of components in FIG. 6 may be implemented by some or all of the components of the hardware device 100 of FIG. 1.

With reference to FIG. 5, in block 502 link selection information based on respective data costs associated with communicating data via a plurality of heterogeneous network links each linking to one or more networks is received from a NLS 300 via a network. Accordingly, a system for communicating data selectively via heterogeneous communication network links includes means for receiving, from a NLS 300 via a network, link selection information based on respective data costs associated with communicating data via a plurality of heterogeneous network links each linking to one or more networks. For example, as illustrated in FIG. 6, a link cost interface component 602 is configured to receive the link selection information from NLS 300 via one or more networks 620.

FIG. 6 is a block diagram illustrating an arrangement of components for communicating data selectively via heterogeneous communication network links according to another aspect of the subject matter described herein. In FIG. 6, one or more networks 620 interconnect NLS 300, user device 140, and one or more remote network nodes 312, such as another user device, a PC, a server. Network 620 includes one or more communication links between the various devices illustrated by communication links 614, 616, and 618, which can each represent a plurality of heterogeneous network links. As described above, the plurality of heterogeneous network links can include network links of the type LTE, LTE-A, CDMA, WCDMA, CDMA2000, GSM, TDMA, FDMA, OFDMA, SC-FDMA, UTRA, E-UTRA, UMB, Wi-Fi, WiMAX, IEEE 802.20, Flash-OFDMA, and Bluetooth.

In another aspect, as described above, respective data costs can include at least one of data throughput, data latency, transmission reliability, transmission interference, power consumption, user device location information, network link location information, and data transmission fees.

In another aspect, as described above, the respective data costs can include respective data costs based on past data cost information. For example, the past data cost information can include past data cost information for a current location of the user device 140. The data cost information can be received from the NLS 300 and can be stored, if necessary, in a local data store 608 and/or a remote data store 610, which are both optional components of the user device 140 as indicated by dashed lines.

In another aspect, the link cost interface component 602 can be configured to receive link selection information from the NLS 300 for the user device 140 to know which network link to use or to use the link selection information to determine which network link to use, as described above.

In another aspect, the link cost interface component 602 can be configured to provide at least one of user preference information and future communication session information to the NLS 300 prior to receiving the network link selection information. For example, the user device 140, via cost interface component 602, can provide details to the NLS 300 about the upcoming communication session, such as the type of session and session requirements, or user preference information to provide additional information for the NLS 300 to base its determination.

Returning to FIG. 5, in block 504 one or more network links to communicate data between a remote network node and a user device remotely communicating with the NLS 300 is selected from among the plurality of heterogeneous network links based on the received link selection information. Accordingly, a system for communicating data selectively via heterogeneous communication network links includes means for selecting, from among the plurality of heterogeneous network links based on the received link selection information, one or more network links to communicate data between a remote network node and a user device remotely communicating with the NLS 300. For example, as illustrated in FIG. 5, a link selection component 604 is configured to select, from among the plurality of heterogeneous network links based on the received link selection information, one or more network links to communicate data between a remote network node and a user device remotely communicating with the NLS 300.

In another aspect, the link selection component 604 can be configured to select one or more links by selecting multiple links and the communication component 606 can be configured to provide for communicating the data for a single communication session concurrently over the multiple selected links. As shown in FIG. 6, communication link 618 can be made up of multiple network links, such as network links 404 and 408 in FIG. 4, and data for a single communication session can be transmitted over the multiple links concurrently.

Returning to FIG. 5, in block 506 the data is communicated via the selected link. Accordingly, a system for communicating data selectively via heterogeneous communication network links includes means for communicating the data via the selected link. For example, as illustrated in FIG. 5, a communication component 606 is configured to communicate the data via the selected link.

In an aspect, the communication component 606 can be configured to connect the user device 140 to the one or more selected links such that the data is transmitted via a common link and distributed to the one or more selected links. For example, with reference to FIG. 6, the data can be provided to the NLS 300 via communication link 616 and placed on the one or more selected network links by the NLS 300 via communication link 618 to a remote node 312. Communication link 616 may or may not be one of the multiple heterogeneous network links.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for communicating data selectively via heterogeneous communication network links, the method comprising:
   determining, by a network link selector (NLS) and based on past data cost information, respective data costs associated with communicating data via a plurality of heterogeneous network links each linking to one or more networks;
   selecting, from among the plurality of heterogeneous network links based on the determined respective data costs, one or more network links to communicate data between a remote network node and a user device remotely communicating with the NLS via a network; and
   providing for communicating the data via the selected link.

2. The method of claim 1 wherein the plurality of heterogeneous network links includes network links of the type Long Term Evolution (LTE), LTE-Advance (LTE-A), Code Division Multiple Access (CDMA), Wideband CDMA (WCDMA), CDMA2000, Global System for Mobile Communications (GSM), Time Division Multiple Access (TDMA), Frequency Division Multiple Access (FDMA), Orthogonal Frequency Division Multiple Access (OFDMA), Single-Carrier Frequency Division Multiple Access (SC-FDMA), Universal Terrestrial Radio Access (UTRA), Evolved UTRA (E-UTRA), Ultra Mobile Broadband (UMB), IEEE 802.11 (Wi-Fi), IEEE 802.16 (WiMAX), IEEE 802.20, Flash-OFDMA, or Bluetooth.

3. The method of claim 1 wherein determining respective data costs includes determining at least one of data throughput, data latency, transmission reliability, transmission interference, power consumption, user device location information, network link location information, and data transmission fees.

4. The method of claim 1 wherein the past data cost information includes past data cost information for a current location of the user device.

5. The method of claim 1 wherein providing for communicating the data includes providing network link selection information to the user device for communicating the data via the selected one or more network links.

6. The method of claim 5 wherein network link selection information includes the respective data costs.

7. The method of claim 1 wherein selecting one or more network links includes receiving at least one of user preferences and future communication session information from the user device and selecting the network link based on the at least one of user preferences and future communication session information.

8. The method of claim 1 further comprising connecting the user device to the one or more selected links via the NLS, wherein the data is transmitted to the NLS via a common link and distributed to the one or more selected links via the NLS.

9. The method of claim 8 wherein the common link is not one of the plurality of heterogeneous network links.

10. The method of claim 8 wherein the common link is one of the plurality of heterogeneous network links.

11. The method of claim 1 wherein selecting one or more links includes selecting multiple links and wherein providing for communicating the data includes communicating data for a single communication session concurrently over the multiple selected links.

12. The method of claim 11 further comprising connecting the user device to the multiple selected links via the NLS, wherein the data is received by the NLS from the user device via a common link and concurrently distributed to the multiple selected links by the NLS.

13. The method of claim 11 further comprising connecting the user device to the multiple selected links via the NLS, wherein the data is received concurrently via the multiple selected links by the NLS and provided to the user device.

14. A method for communicating data selectively via heterogeneous communication network links, the method comprising:
receiving, from a NLS via a network, link selection information based on respective data costs associated with communicating data via a plurality of heterogeneous network links each linking to one or more networks, wherein the respective data costs includes respective data costs based on past data cost information;
selecting, from among the plurality of heterogeneous network links based on the received link selection information, one or more network links to communicate data between a remote network node and a user device remotely communicating with the NLS via the network; and
communicating the data via the selected link.

15. The method of claim 14 wherein the plurality of heterogeneous network links includes network links of the type LTE, LTE-A, CDMA, WCDMA, CDMA2000, GSM, TDMA, FDMA, OFDMA, SC-FDMA, UTRA, E-UTRA, UMB, Wi-Fi, WiMAX, IEEE 802.20, Flash-OFDMA, or Bluetooth.

16. The method of claim 14 wherein respective data costs include at least one of data throughput, data latency, transmission reliability, transmission interference, power consumption, user device location information, network link location information, and data transmission fees.

17. The method of claim 14 wherein the past data cost information includes past data cost information for a current location of the user device.

18. The method of claim 14 comprising providing at least one of user preferences and future communication session information to the NLS prior to receiving the network link selection information.

19. The method of claim 18 wherein network future communication session information includes at least one of a type of session and requirements for the session.

20. The method of claim 14 further comprising connecting the user device to the one or more selected links via the NLS, wherein the data is transmitted to the NLS via a common link and distributed to the one or more selected links via the NLS.

21. The method of claim 20 wherein the common link is not one of the plurality of heterogeneous network links.

22. The method of claim 20 wherein the common link is one of the plurality of heterogeneous network links.

23. The method of claim 14 wherein selecting one or more links includes selecting multiple links and wherein communicating the data includes communicating data for a single communication session concurrently over the multiple selected links.

24. The method of claim 23 further comprising connecting the user device to the multiple selected links via the NLS, wherein the data is received by the NLS from the user device via a common link and concurrently distributed to the multiple selected links by the NLS.

25. The method of claim 23 further comprising connecting the user device to the multiple selected links via the NLS, wherein the data is received concurrently via the multiple selected links by the NLS and provided to the user device.

26. A system for communicating data selectively via heterogeneous communication network links, the system comprising:
means for determining, by a NLS and based on past data cost information, respective data costs associated with communicating data via a plurality of heterogeneous network links each linking to one or more networks;
means for selecting, from among the plurality of heterogeneous network links based on the determined respective data costs, one or more network links to communicate data between a remote network node and a user device remotely communicating with the NLS via a network; and
means for providing for communicating the data via the selected link.

27. A system for communicating data selectively via heterogeneous communication network links, the system comprising system components including:
a link cost component configured to determine, by a NLS and based on past data cost information, respective data costs associated with communicating data via a plurality of heterogeneous network links each linking to one or more networks;
a link selection component configured to select, from among the plurality of heterogeneous network links based on the determined respective data costs, one or more network links to communicate data between a remote network node and a user device remotely communicating with the NLS via a network; and
a communication component configured to provide for communicating the data via the selected link.

28. The system of claim 27 wherein the plurality of heterogeneous network links includes network links of the type LTE, LTE-A, CDMA, WCDMA, CDMA2000, GSM, TDMA, FDMA, OFDMA, SC-FDMA, UTRA, E-UTRA, UMB, Wi-Fi, WiMAX, IEEE 802.20, Flash-OFDMA, or Bluetooth.

29. The system of claim 27 wherein the link cost component is configured to determine respective data costs by determining at least one of data throughput, data latency, transmission reliability, transmission interference, power consumption, user device location information, network link location information, and data transmission fees.

30. The system of claim 27 wherein the past data cost information includes past data cost information for a current location of the user device.

31. The system of claim 27 wherein the communication component is configured to provide for communicating the data by providing network link selection information to the user device for communicating the data via the selected one or more network links.

32. The system of claim 31 wherein network link selection information includes the respective data costs.

33. The system of claim 27 wherein the link selection component is configured to select one or more network links by receiving at least one of user preferences and future communication session information from the user device and selecting the network link based on the at least one of user preferences and future communication session information.

34. The system of claim 27 wherein the communication component is configured to connect the user device to the one or more selected links such that the data is transmitted via a common link and distributed to the one or more selected links.

35. The system of claim 34 wherein the common link is not one of the plurality of heterogeneous network links.

36. The system of claim 34 wherein the common link is one of the plurality of heterogeneous network links.

37. The system of claim 27 wherein the link selection component is configured to select one or more links by selecting multiple links and wherein the communication component is configured to provide for communicating the data by communicating data for a single communication session concurrently via the multiple selected links.

38. A system for communicating data selectively via heterogeneous communication network links, the system comprising:
   means for receiving, from a NLS via a network, link selection information based on respective data costs associated with communicating data via a plurality of heterogeneous network links each linking to one or more networks, wherein the respective data costs includes respective data costs based on past data cost information;
   means for selecting, from among the plurality of heterogeneous network links based on the received link selection information, one or more network links to communicate data between a remote network node and a user device remotely communicating with the NLS; and
   means for communicating the data via the selected link.

39. A system for communicating data selectively via heterogeneous communication network links, the system comprising system components including:
   a link cost interface component configured to receive, from a NLS via a network, link selection information based on respective data costs associated with communicating data via a plurality of heterogeneous network links each linking to one or more networks, wherein the respective data costs includes respective data costs based on past data cost information;
   a link selection component configured to select, from among the plurality of heterogeneous network links based on the received link selection information, one or more network links to communicate data between a remote network node and a user device remotely communicating with the NLS; and
   a communication component configured to communicate the data via the selected link.

40. The system of claim 39 wherein the plurality of heterogeneous network links includes network links of the type LTE, LTE-A, CDMA, WCDMA, CDMA2000, GSM, TDMA, FDMA, OFDMA, SC-FDMA, UTRA, E-UTRA, UMB, Wi-Fi, WiMAX, IEEE 802.20, Flash-OFDMA, or Bluetooth.

41. The system of claim 39 wherein respective data costs include at least one of data throughput, data latency, transmission reliability, transmission interference, power consumption, user device location information, network link location information, and data transmission fees.

42. The system of claim 39 wherein the past data cost information includes past data cost information for a current location of the user device.

43. The system of claim 39 wherein the link cost interface component is configured to provide at least one of user preferences and future communication session information to the NLS prior to receiving the network link selection information.

44. The system of claim 43 wherein network future communication session information includes at least one of a type of session and requirements for the session.

45. The system of claim 39 wherein the communication component is configured to transmit the data to the NLS via a common link and distribute to the one or more selected links via the NLS.

46. The system of claim 45 wherein the common link is not one of the plurality of heterogeneous network links.

47. The system of claim 45 wherein the common link is one of the plurality of heterogeneous network links.

48. The system of claim 39 wherein the link selection component is configured to select one or more links by selecting multiple links and wherein the communication component is configured to provide for communicating the data by communicating data for a single communication session concurrently over the multiple selected links.

49. A non-transient computer readable medium storing a computer program, executable by a machine, for communicating data selectively via heterogeneous communication network links, the computer program comprising executable instructions for:
   determining, by a NLS and based on past data cost information, respective data costs associated with communicating data via a plurality of heterogeneous network links each linking to one or more networks;
   selecting, from among the plurality of heterogeneous network links based on the determined respective data costs, one or more network links to communicate data between a remote network node and a user device remotely communicating with the NLS via a network; and
   providing for communicating the data via the selected link.

50. A non-transient computer readable medium storing a computer program, executable by a machine, for communicating data selectively via heterogeneous communication network links, the computer program comprising executable instructions for:
   receiving, from a NLS via a network, link selection information based on respective data costs associated with communicating data via a plurality of heterogeneous network links each linking to one or more networks, wherein the respective data costs includes respective data costs based on past data cost information;
   selecting, from among the plurality of heterogeneous network links based on the received link selection information, one or more network links to communicate data between a remote network node and a user device remotely communicating with the NLS; and
   communicating the data via the selected link.

* * * * *